United States Patent [19]

Saito

[11] 4,116,178

[45] Sep. 26, 1978

[54] EXHAUST GAS RECIRCULATION APPARATUS

[75] Inventor: Haruhiko Saito, Nagoya, Japan

[73] Assignee: Toyota Jidosha Kogyo Kabushiki Kaisha, Toyota, Japan

[21] Appl. No.: 765,068

[22] Filed: Feb. 2, 1977

[30] Foreign Application Priority Data

Dec. 10, 1976 [JP] Japan ................................ 51-148449

[51] Int. Cl.$^2$ ............................................ H02M 25/06

[52] U.S. Cl. ........................... 123/119 A; 123/198 D; 123/198 DB; 123/DIG. 11

[58] Field of Search ................... 123/119 A, DIG. 11, 123/198 D, 198 DB

[56] References Cited

U.S. PATENT DOCUMENTS 1,751,322 3/1930 Grauel ......................... 123/DIG. 11

3,994,269 11/1976 Takaoka et al. ................ 123/119 A 3,998,192 12/1976 Berzlapa ......................... 113/119 A

*Primary Examiner*—Wendell E. Burns

*Attorney, Agent, or Firm*—Stevens, Davis, Miller & Mosher

[57] ABSTRACT

Disclosed is an exhaust gas recirculation apparatus for an internal combustion engine, which has a vacuum operated flow control valve arranged on pipe means connecting the exhaust manifold of the engine with the intake manifold of the engine. When the throttle valve is opened from its idle position during the operation of the engine, the flow control valve is opened in order to recirculate exhaust gas from the exhaust manifold to the intake manifold. The apparatus further has means for opening the flow control valve when so-called "dieseling" takes place after the operation of the engine is stopped. The exhaust gas due to the dieseling can be recirculated and, thus, the dieseling is instantly stopped.

2 Claims, 2 Drawing Figures

EXHAUST GAS RECIRCULATION APPARATUS

FIELD OF THE INVENTION

The present invention relates to an exhaust gas recirculation apparatus for an internal combustion engine, which is capable of preventing so-called "dieseling".

BACKGROUND OF THE INVENTION

In a carburetor type internal combustion engine, so-called "dieseling" is a phenomenon wherein the engine continues to rotate after the ignition switch is opened because of compressed ignition of fuel issued from the idle port of the carburetor. In such an engine, dieseling is generated under condition where the temperature of intake air is relatively high. Such dieseling causes a large amount of unburnt air-fuel mixture to be provided in the exhaust manifold. This large amount of unburnt air-fuel mixture causes overheating of the catalytic converter arranged in the exhaust pipe of the engine.

To prevent dieseling, an engine has been already provided which has an electro-magnetic value situated on a primary low speed fuel passageway of the carburetor, connecting the idle port with the float chamber of the carburetor. The electro-magnetic valve operates to close the passageway, when the ignition switch is opened to stop the engine, in order to prevent the fuel from being transmitted to the idle port. Thus, dieseling caused by fuel from the idle port does not occur.

However, the above-mentioned known art cannot prevent dieseling caused by the fuel from the secondary low-speed fuel passageway of the carburetor. Such dieseling occurs when the secondary throttle valve of the carburetor is, after the ignition switch is opened, not completely closed due to clogging in such a manner that the secondary throttle valve is located above a slow port connected to the float chamber via the secondary low-speed fuel passageway.

SUMMARY OF THE INVENTION

An object of the present invention is to provide a new system capable of preventing dieseling of the carburetor type internal combustion engine.

Another object of the present invention is to provide a system capable of preventing dieseling in an internal combustion engine having a so-called exhaust gas recirculation apparatus.

Still another object of the present invention is to provide an exhaust gas recirculation apparatus capable of preventing dieseling due to the fuel from both the primary and the secndary low speed fuel passageways of the carburetor.

In order to attain these objects an exhaust gas recirculation apparatus for an internal combustion engine is provided, comprising:

pipe means connecting the exhaust system of the engine with the intake system of the engine, and;

a vacuum operated valve which is arranged on said pipe means and which has a vacuum operating chamber connected to a first vacuum port formed in the intake system at a position located slightly upstream of the throttle valve which is closed to its idle position, whereby the vacuum operated valve is opened by a vacuum signal transmitted to said chamber from said first vaccum port when the throttle valve is, during the operation of the engine, opened from the idle position so that the port is located downstream of the throttle valve, so that a part of the gas from the exhaust system is recirculated to the intake system via said passageway means. The apparatus further comprises means for connecting said vacuum operating chamber of the vacuum operated valve with a second vacuum port formed in the intake system at a position located downstream of the throttle valve which is closed to its idle position. The vacuum operated valve is opened by a vacuum signal which is formed in the intake system when so called "dieseling" takes place after the operation of the engine is stopped and which is transmitted to said chamber from the second vacuum port. Therefore, the exhaust gas in the exhaust system due to the "dieseling" is recirculated to the intake system via said passageway means and, thus, the "dieseling" is instantly stopped.

DETAILED DESCRIPTION OF AN EMBODIMENT

Figure 1:
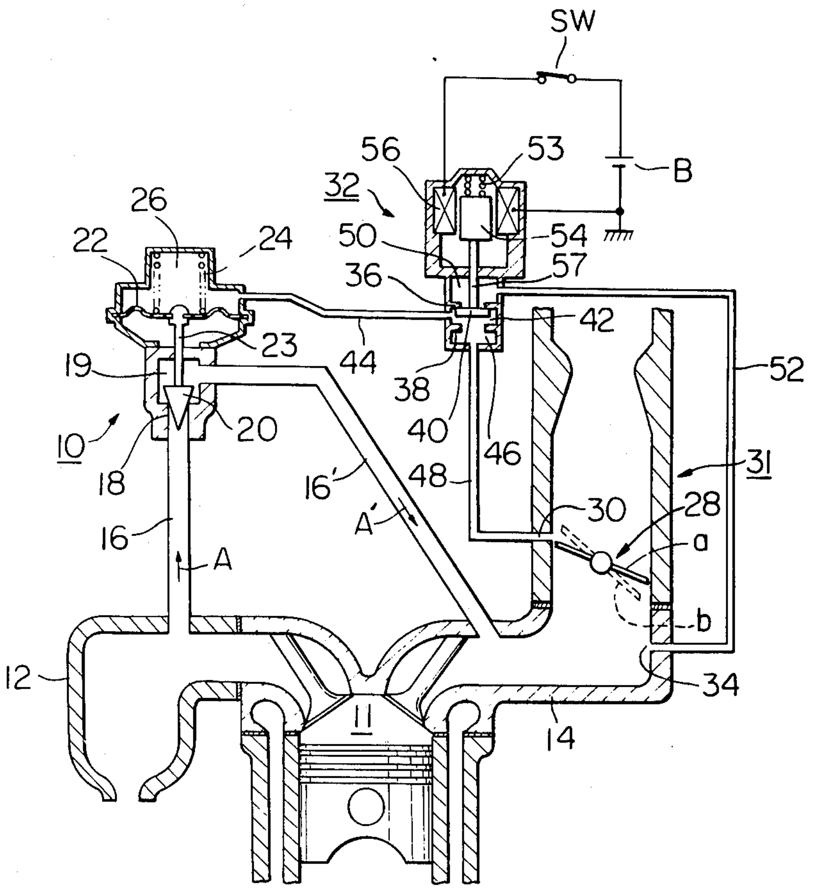
FIG. 1 is a schematic view of an exhaust gas recirculation system according to the present invention, in which the ignition switch of the engine is in its ON position.

In FIG. 1, showing an exhaust gas recirculation apparatus according to the present invention, numeral 10 designates a vacuum operated valve (so-called EGR valve) adapted for controlling the amount of exhaust gas to be recirculated. The ERG valve 10 has a valve seat 18 connected to an exhaust manifold 12 of the engine via a pipe 16. A valve member 20 faces the valve seat 18 for controlling the amount of exhaust gas introduced into a chamber 19 from the pipe 16. The chamber 19 is connected to an intake manifold 14 of the engine via a pipe 16'. The ERG valve 10 further has a diaphragm 22 which is connected to the valve member 20 by means of a rod 23 and which is downwardly urged by a spring 24 to cause the valve member 20 to be rested on the valve seat 18. A vacuum signal chamber 26 is formed on one side of the diaphragm remote from the valve member 20. The chamber 26 is, as is described hereinafter, connected to a port 30 (so called EGR port) which is formed in a carburetor 31 of the engine at a position slightly above a primary or secondary throttle valve 28 of the carburetor 31 when it is closed to its idle position, as shown by a solid line *a*. When the throttle valve 28 is, during the operation of the engine, opened from the idle position a so that the port 30 is located below the throttle valve, as shown by a dotted line *b*, a vacuum signal is allowed to be transmitted from the port 30 to the vacuum signal chamber 26 of the EGR valve 10. As a result of this, the diaphragm 22 is displaced upwardly against the force of the spring 24, causing the valve member 20 to be detached from the valve seat 18. Thus, an amount of the exhaust gas from the exhaust manifold is introduced into the chamber 19 via the pipe 16 as shown by an arrow A, and is introduced into the intake manifold 14 via the pipe 16' as shown by an arrow A'. In this manner the exhaust gas recirculation operation is carried out.

Figure 2:
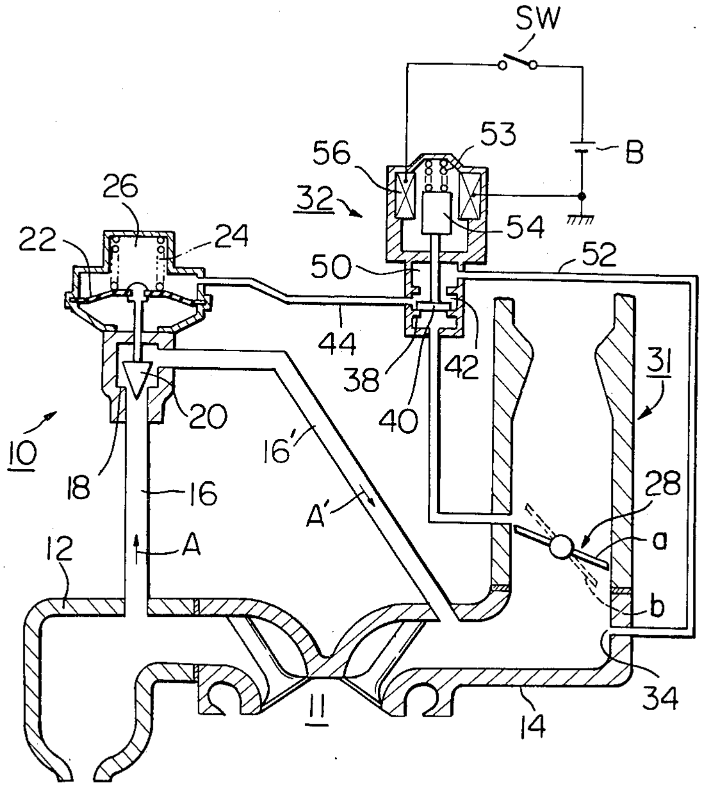
FIG. 2 is a view which is the same as FIG. 1, except that the ignition switch is in its OFF position.

The above-mentioned construction and operation of the EGR apparatus is substantially the same as the known art. According to the present invention, hereinafter described, a construction is newly provided in order to prevent the so called "dieseling" after the operation of the engine is stopped. Numeral 32 designates an electro-magnetic vacuum switching valve adapted for communicating the vacuum chamber 26 of the EGR valve 10 with the EGR port when an ignition switch SW of the engine is in its ON position in order to operate the engine, and for communicating the vacuum chamber 26 with a second vacuum signal port 34 formed in the intake manifold 14 at a position located downsteam of the throttle valve when the ignition switch SW is switched to its OFF position in order to stop the operation of the engine. The vacuum switching valve 32 has a chamber 42 connected to the vacuum operating chamber 26 of the EGR valve 10 via a vacuum signal tube 44, a chamber 46 capable of being connected to the chamber 42 via a valve seat 38 and a chamber 50 capable of being connected to the chamber 42 via another valve seat 36. The chamber 46 communicates with the EGR port 30 via a vacuum signal tube 48, whereas the chamber 50 communicates with the second vacuum signal port 34 via a vacuum signal tube 52. A valve member 40 is arranged between the valve seats 36 and 38, and is mechanically connected to an operating member 54 by means of a rod 57. The member 54, which is urged downwardly by a spring 53, is inserted to a solenoid coil 56 of a tubular shape. The solenoid coil 56 is electrically connected to the battery B of the engine via the ignition switch SW. When the ignition switch SW is in its ON position, as shown in FIG. 1, the solenoid coil 56 is energized. Therefore, the member 56 is moved upwardly against the spring 53 under the electro-magnetic force generated between the member 54 and the energized solenoid 56, so that the valve 32 is switched to a first position in which the valve member 40 is rested on the valve seat 36 to permit communication between the chambers 42 and 46. When the ignition switch SW is in its OFF position as shown in FIG. 2, the solenoid coil 56 is not energized. Therefore, the member 54 is moved downwardly by the spring 53, so that the valve 32 is switched to a second position in which the valve member 40 is rested on the valve seat 38 to permit communication between the chambers 42 and 50.

The above-mentioned exhaust gas recirculation apparatus operates as follows. When the engine is operating, the ignition switch SW is in its ON position as shown in FIG. 1. Therefore, the vacuum switching valve 32 is in its first position in which the chamber 42 communicates with the chamber 46, so that the vacuum chamber 26 of the EGR valve 10 communicates with the EGR port 30 via the tube 44, the chambers 42 and 46, and the tube 48. Thus, the EGR valve 10 is opened to cause the valve member 20 to be detached from the valve seat 18 when the throttle valve 28 is opened as shown by the dotted line *b* so that the port 30 is located downstream of the throttle valve. As a result, exhaust gas from the exhaust manifold 12 is recirculated to the intake manifold via the pipe 16 as shown by the arrow A, and the pipe 16' as shown by the arrow A'.

When the ignition switch SW is switched to the OFF position, as shown by FIG. 2, to prevent the generation of a discharge arc between the sparking electrodes of the sparking plug in order to stop the operation of the engine, the vacuum switching valve 32 is switched to its second position in which the valve member 40 is rested on the valve seat 38 to cause communication between the chambers 42 and 50. Thus, the vacuum chamber 26 of the EGR valve 10 communicates with the second vacuum signal port 34 via the tube 44, the chambers 42 and 50, and the tube 52. If so called "dieseling" is generated after the ignition switch SW is switched to its OFF position, which is such as phenomenon that the combustion in the engine continues to rotate the engine without the discharge arc between the electrodes, due to compresive ignition of fuel issued from a not shown primary and/or a secondary low speed fuel passageway of the carburetor 31, vacuum pressure is formed at the port 34 located downstream of the throttle valve 28 which is closed, as shown by the solid line *a*.

Thus, a vacuum signal is transmitted from the port 34 to the vacuum chamber 26 of the EGR valve 10, via the tube 52, the chambers 50 and 42, and the tube 44, so that the EGR valve 10 is opened to cause the valve member 20 to be detached from the valve seat 18. Therefore, exhaust gas in the exhaust manifold 12, due to the rotation of the engine after the ignition switch is opened, is recirculated into the intake manifold 14 via the pipe 16 as shown by the arrow A, and via the pipe 16' as shown by the Arrow A'. Since the combustion of fuel due to the dieseling is not stable, because of no discharge arc between the sparking electrodes and since the exhaust gas recirculation adversely affects the combustion, the combustion of fuel due to the "dieseling" is instantly stopped and, thus, the rotation of the engine is stopped.

As will be clear from the above description, "dieseling" is effectively stopped, according to the invention, by recirculating exhaust gas due to the rotation of the engine after the ignition switch is opened. Therefore, dieseling, which is caused by fuel issued from both the primary and secondary low speed fuel passageway can be effectively prevented according to the invention.

What is claimed is:

1. An exhaust gas recirculation apparatus for an internal combustion engine, comprising:
   - an exhaust system and an intake system connected with said engine, said intake system including an intake passage with a throttle valve mounted therein;
   - pipe means connecting said exhaust system with said intake system;
   - a vacuum operated flow control valve arranged on said pipe means and having a vacuum operating chamber which is normally connected to a first vacuum port formed in said intake passage at a position located slightly upstream of said throttle valve when closed in its idle position, said vacuum operated valve being opened by a vacuum signal transmitted to said chamber from said first vacuum port when the throttle valve is, during the operation of the engine, opened from said idle position so that the port is located downstream of said throttle valve, thereby causing a part of the gas from the exhaust system to be recirculated to the intake system via said pipe means; and,
   - switching valve means for disconnecting the connection of said vacuum operating chamber with said first port, and for connecting said vacuum operating chamber with a second vacuum port formed in said intake passage at a position located downstream of said throttle valve in its idle position when the operation of the engine is stopped. the connection of said vacuum operating chamber with said second vacuum port allowing the opening of said valve in response to a vacuum signal which is formed in the intake system when engine "dieseling" takes place thereby causing the exhaust gas in the exhaust system due to the "dieseling" to be recirculated to the intake system via said pipe means.

2. An exhaust gas recirculation apparatus as in claim 1 further comprising a battery and an ignition switch which controls the on-off operation of said engine, and wherein said switching valve means comprises an electromagnetic switching valve operated by said battery when said ignition switch is in an on position to couple said first vacuum port with said vacuum chamber, said electromagnetic switching valve being disconnected from said battery when said ignition switch is in an off position to couple said vacuum port with said vacuum chamber.

* * * * *